Oct. 6, 1931.  W. KRENZEL  1,826,551
AGRICULTURAL MACHINE ATTACHMENT
Filed July 19, 1930   3 Sheets-Sheet 1
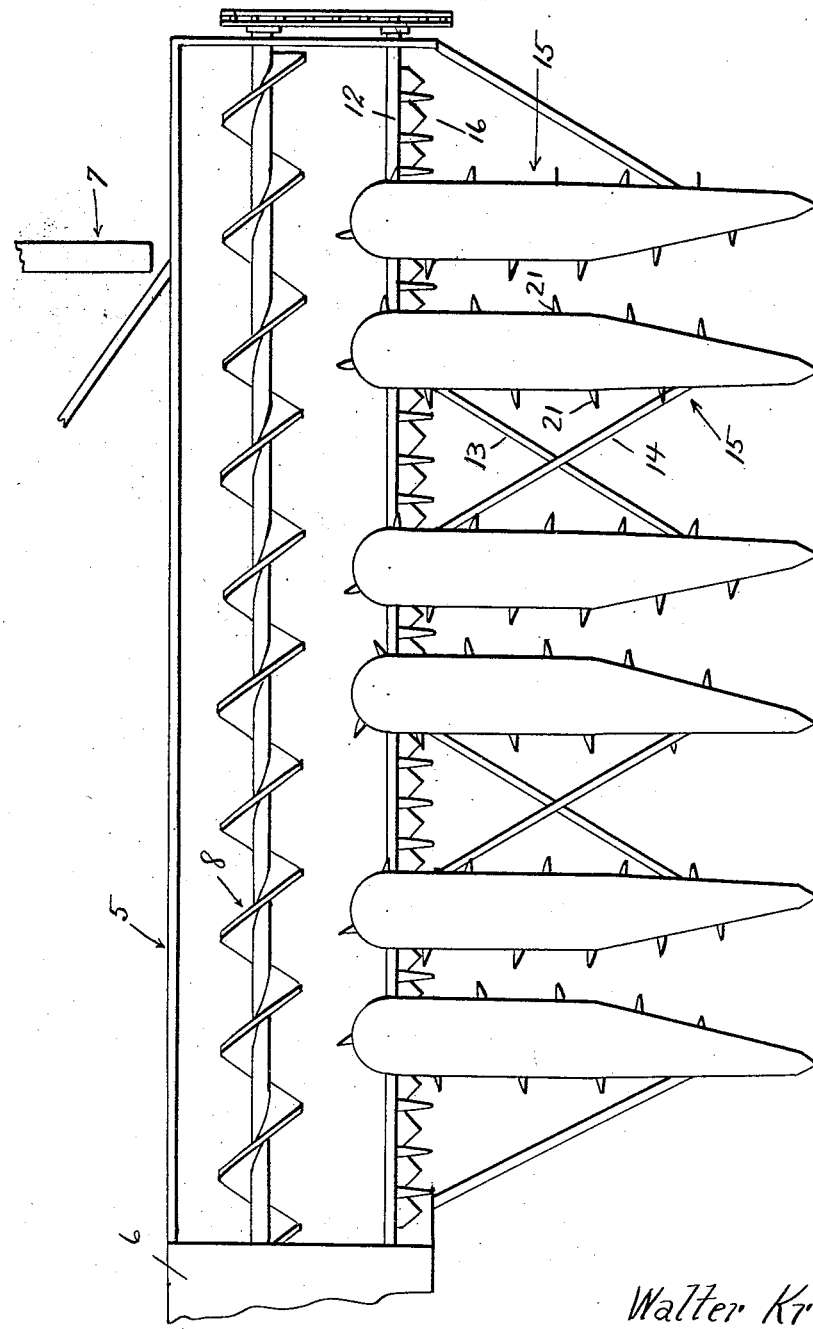
Inventor
Walter Krenzel
By Clarence A. O'Brien
Attorney

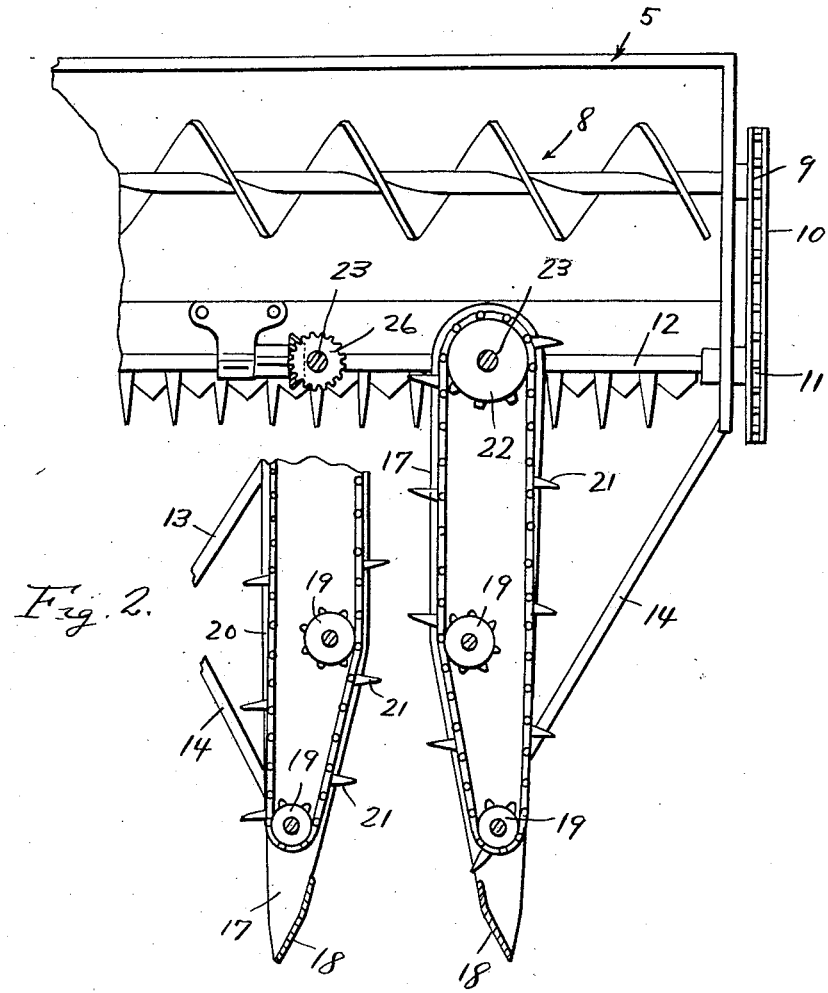
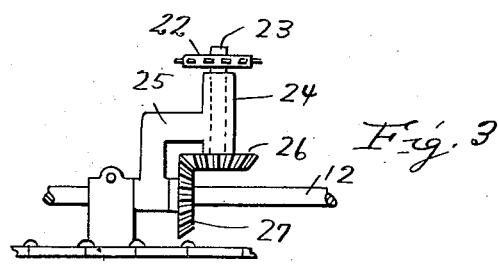

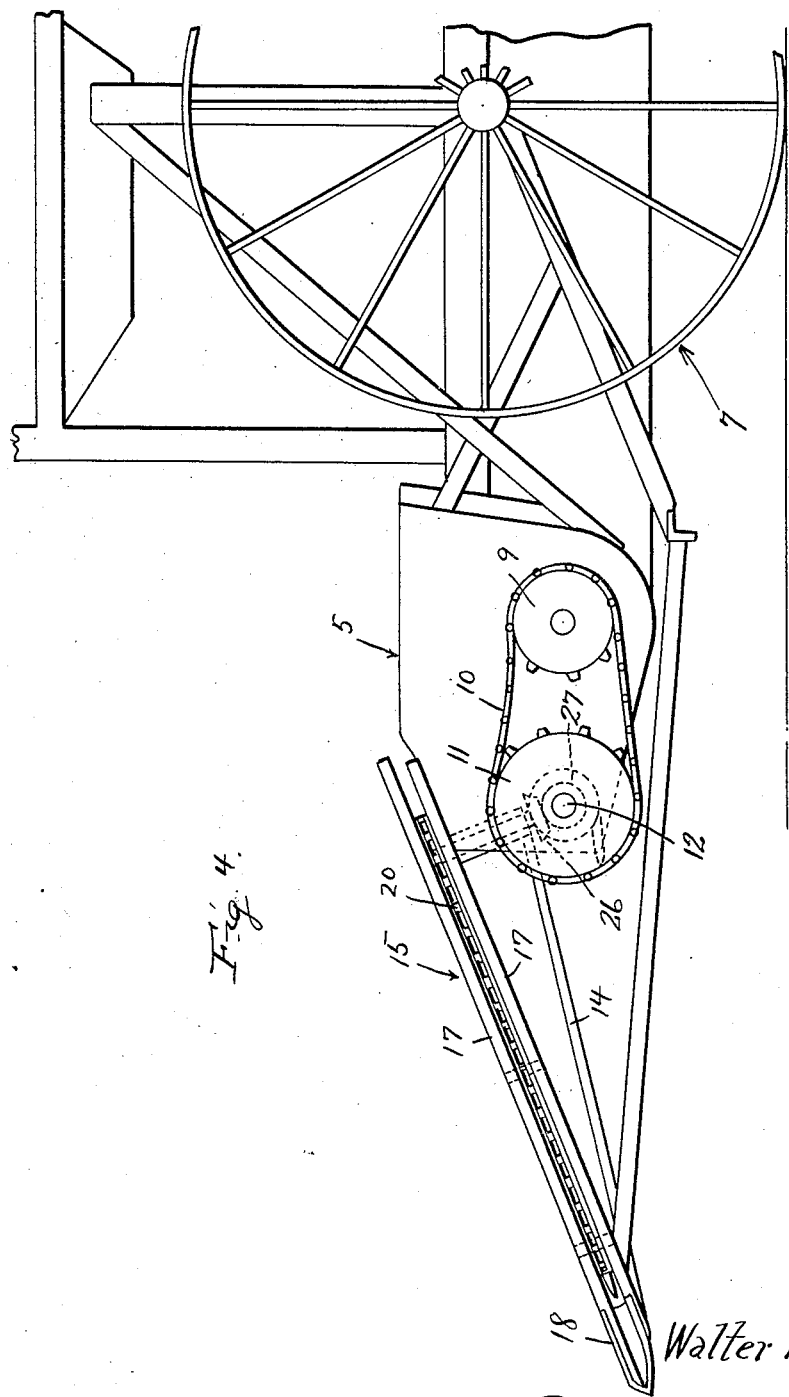

Patented Oct. 6, 1931

1,826,551

UNITED STATES PATENT OFFICE

WALTER KRENZEL, OF LEOTI, KANSAS

AGRICULTURAL MACHINE ATTACHMENT

Application filed July 19, 1930. Serial No. 469,197.

This invention relates to an appliance or attachment for use and association with an agricultural machine generally known in the trade as a combine which is used for harvesting row crops, and the purpose of the attachment is to provide a practical and simplified means for lifting and picking up and feeding drooping stalks into a receiver for conveyance to the combine.

The presence of this attachment on a combine machine of the class described renders said machine successful for harvesting maize and kaffir, thus permitting handling of the latter type of plants with as much ease as is encountered in harvesting wheat.

Briefly stated, the attachment comprehends the provision of a trough-like receiver containing a screw conveyer, having a reciprocatory cutter bar construction on the end portion thereof and a plurality of sets of feeder units which are constructed and appropriately inclined for elevating and conducting the bending or drooping plants to the cutter bar mechanism, for severing and subsequent handling by the conveyor.

In carrying the inventive conception into practice, I have developed a novel and simplified organization of parts which are mechanically related in such a manner as to permit the attachment to fulfill the requirements of an invention of this class in a highly satisfactory and dependable manner.

Other features and advantages will become more readily apparent from the following description and drawings.

In the drawings:

Figure 1 is a top plan view of the assembly constituting the feature of the improved attachment.

Figure 2 is an enlarged fragmentary view in section and elevation showing the association of mechanical elements more plainly.

Figure 3 is a detail view of the gearing drive for the feeder chains.

Figure 4 is an end elevation of the structure shown in Figure 1, observing it in a direction from right to left and showing a small portion of the wheel supported conveyance.

Referring to Figure 1, it will be observed that the numeral 5 designates a longitudinally elongated trough-like receptacle or receiver which has communication with the cylinder 6 leading to the combine machinery (not shown). This device 5 is supported through appropriate means on the wheeled conveyance or support, generally denoted by the numeral 7.

Mounted for rotation therein is a screw conveyor 8 having a sprocket wheel 9 on the right hand end thereof. Trained over this sprocket wheel is a chain 10 which also serves to drive a power take-off sprocket wheel 11. The wheel 11 is on the right hand end of the rotary propeller shaft 12 for the various feeder units.

These units are arranged in sets or pairs as is shown in Figure 1 and secured in suitable relationship through the medium of appropriate diagonal intersecting braces or equivalent elements 13 and 14. Each unit is designated by the numeral 15 and all units are the same in construction. Broadly, they embody downwardly and forwardly inclined means for facilitating the pick-up and for guiding the stalks into cutting relationship with respect to the cutter bar mechanism generally designated by numeral 16.

Each unit comprises top and bottom spaced parallel plates 17 having pointed end portion joined together by an appropriately shaped web which facilitates elevation of the drooping stalks. Mounted between these plates are a series of sprockets 19 over which the sprocket conveyor chains 20 are trained. At suitably spaced points on the chain are gathering fingers 21 appropriately located for feeding stalks against the cutting element of the cutter bar mechanism.

The main sprocket 22 (see Figure 3) is on a stub shaft 23 located in a vertical bearing 24 of the especially appropriated bracket 25 and this stub shaft is provided with a bevelled gear 26 in mesh with a bevelled power supply pinion 27 on the propeller or power supply shaft 12.

Briefly reviewed, it will be seen that the attachment is characterized by a substantially horizontally disposed receiver 5 located in feeding and communicating proximity to the main combine machine (not shown). The rotary screw conveyor 8 in this receiver constitutes the means for transmitting power through the sprocket chain arrangement in the right hand end to the propeller shaft 12.

This in turn simultaneously operates the sprocket chain 20 of the various feeder units 15. The feeder units are disposed in longitudinally spaced relationship along the intake or mouth portion of the trough-like receiver and are disposed in such angular inclination with respect to the surface traversed as to literally pick-up the drooping stalks and to feed them inwardly against the cutter bar mechanism 16 for severing them.

The stalks thus lifted are carried inwardly through the medium of the feeding fingers 21 to the aforesaid sprocket chains 20.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

In combination with the platform of a combine, a plurality of gathering devices sloping downwardly and forwardly from the front end of the platform, each device consisting of an upper and a lower plate connected together in spaced parallelism, a connecting web at the forward end of the plates, sprockets rotatably arranged between the plates, a bracket supported from the platform and having a vertically arranged portion, a stub shaft rotatably arranged in said portion and having its upper end passing through the rear ends of the plates, a sprocket on said shaft located between the plates, an endless chain passing over said sprocket and the sprockets aforementioned, fingers on the chain, and means for rotating the stub shaft from a movable part of the combine.

In testimony whereof I affix my signature.

WALTER KRENZEL.